US006963784B1

(12) United States Patent
Gibbs

(10) Patent No.: US 6,963,784 B1
(45) Date of Patent: Nov. 8, 2005

(54) VIRTUAL DEVICE CONTROL MODULES AND FUNCTION CONTROL MODULES IMPLEMENTED IN A HOME AUDIO/VIDEO NETWORK

(75) Inventor: Simon Gibbs, Sunnyvale, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/174,078

(22) Filed: Oct. 16, 1998

(51) Int. Cl.$^7$ .............................................. G06F 17/00
(52) U.S. Cl. .............................. 700/94; 710/72; 710/10
(58) Field of Search ........................... 700/94; 710/72, 710/10

(56) References Cited

U.S. PATENT DOCUMENTS

| 4,893,199 A | 1/1990 | Okada |
| 5,420,573 A | 5/1995 | Tanaka et al. |
| 5,537,605 A | 7/1996 | Teece |
| 5,790,423 A | 8/1998 | Lau et al. |
| 5,798,922 A | 8/1998 | Wood et al. |

| 6,349,352 B1 * | 2/2002 | Lea .............................. 710/72 |

FOREIGN PATENT DOCUMENTS

JP          2767795          3/1989          ............. H04L 5/22

OTHER PUBLICATIONS

Sony et al.; "The Havi Architecture"; Specification of the Home Audio/Video Interoperability (Havi) Architecture; May 11, 1998; Copyright 1997, 1998.

* cited by examiner

*Primary Examiner*—Huyen Le
*Assistant Examiner*—Justin Michalski
(74) *Attorney, Agent, or Firm*—Wagner, Murabito & Hao LLP

(57) ABSTRACT

A virtual device control module for interfacing with a target device is disclosed. A DCM (device control module) is operable for interfacing with the target device, wherein the DCM includes a first FCM (function control module) and a second FCM operable for controlling respective first and second functional components of the target device. The first FCM can be a physical FCM operable for controlling the operation of the first functional component, and the second FCM can be a virtual FCM operable for controlling the operation of a second functional component.

27 Claims, 12 Drawing Sheets

VIRTUAL DEVICE CONTROL MODULES AND FUNCTION CONTROL MODULES IMPLEMENTED IN A HOME AUDIO/VIDEO NETWORK

FIELD OF THE INVENTION

The field of the present invention pertains to audio-video systems. More particularly, the present invention pertains to implementing standardized software-based interaction between devices coupled in a home audio video network.

BACKGROUND OF THE INVENTION

A typical home audiovisual equipment set up includes a number of components. For example, a radio receiver, a CD player, a pair of speakers, a television, a VCR, a tape deck, and the like. These components are connected to each other via a set of wires. One component is usually the central component of the home audiovisual system. This is usually the radio receiver, or the tuner. The tuner has a number of specific inputs for coupling the other components. The tuner has a corresponding number of control buttons or control switches which provide a limited degree of controllability and interoperability for the components. The control buttons and control switches are usually located on the front of the tuner. In many cases, some, or all, of these buttons and switches are duplicated on a hand held remote control unit. A user controls the home audiovisual system by manipulating the buttons and switches on the front of the tuner, or alternatively, manipulating buttons on the hand held remote control unit.

This conventional home audiovisual system paradigm has become quite popular. As consumer electronic devices become more capable and more complex, the demand for the latest and most capable devices has increased. As new devices emerge and become popular, the devices are purchased by consumers and "plugged" into their home audiovisual systems. Generally, the latest and most sophisticated of these devices are quite expensive (e.g., digital audio tape recorders, DVD players, digital camcorders, and the like). As a consumer purchases new devices, the new device is most often simply plugged into the system alongside the pre-existing, older devices (e.g., cassette tape deck, CD player, and the like). The new device is plugged into an open input on the back of the tuner, or some other device coupled to the tuner. The consumer (e.g., the user) controls the new device via the control buttons on the tuner, via the control buttons and control switches on the front of the new device itself, or via an entirely new, separate, respective remote control unit for the new device.

As the number of new consumer electronics devices for the home audiovisual system has grown, and as the sophistication and capabilities of these devices have increased, a number of problems with the conventional paradigm have emerged. One such problem is incompatibility between devices in the home audiovisual system. Consumer electronic devices from one manufacturer often couple to an audiovisual system in a different manner than similar devices from another manufacturer. For example, a tuner made by one manufacturer may not properly couple with a television made by another manufacturer. Within conventional home audiovisual systems, there is not a standardized way of coupling devices such that they interact predictably and reliably. This is especially true in the case of coupling devices from different manufacturers.

In addition, where one device is much newer than another device additional incompatibilities may exist. For example, a new device might incorporate hardware (e.g., specific inputs and outputs) which enables more sophisticated remote control functions. This hardware may be unusable with older devices within the system. Or, for example, older tuners may lack suitable inputs for some newer devices (e.g., mini-disc players, VCRs, etc.), or may lack enough inputs for all devices of the system.

Another problem is the lack of functional support for differing devices within an audiovisual system. For example, even though a television may support advanced sound formats (e.g., surround sound, stereo, etc.), if an older less capable tuner does not support such functionality, the benefits of the advanced sound formats can be lost.

Another problem is the lack of standardized methods of extending the functionality of the devices within the home audiovisual system. For example, conventional prior art devices are not designed to have their functionality extended after they are purchased by the end-user. Consequently, the functionality of less sophisticated devices is typically fixed by the manufacturer as the devices are fabricated. Often the only option available to the user to add new capability is the purchase of a new, more sophisticated device.

While the emergence of networking and interface technology (e.g., IEEE 1394 serial communication bus and the wide spread adoption of digital systems) offers prospects for correcting these problems, there is still no coherent, open, extensible architecture which can provide for intelligent, self configuring, easily extensible devices or AV systems. There are no standardized methods of extending the functionality of devices in a home audiovisual system. For example, while various solutions involving the use of IEEE 1394 as the basis of an AV system exist, none provides for the extensibility of the capabilities of the various devices coupled within a home AV system over the life times of the devices. There are no standardized, easily extensible methods for augmenting the capability and functionality of simpler devices as new, more sophisticated devices are added within a home AV system.

SUMMARY OF THE INVENTION

Accordingly, what is required is a new architecture for a home audiovisual system which corrects the interoperability and functionality problems of the conventional system. What is required is a new architecture for an open, inter-operating, audiovisual system for devices within a home network which provides for easy extensibility of the features and functions of the devices. What is required is an architecture which allows devices from any manufacturer to function seamlessly with a home audiovisual system, and which enables other devices from any other manufacturer to augment their functionality. What is required is an architecture which is extensible and can be readily modified and advanced as market requirements and technology change. What is further required is a standardized, easily extensible method for augmenting the capability and functionality of simpler devices as new, more sophisticated devices are added within a home AV system.

The present invention provides a new architecture for a home audiovisual system which corrects the interoperability and functionality problems of conventional prior art systems. The system of the present invention provides an architecture for an open, inter-operating, audiovisual system for devices within a home network which provides for easy extensibility of the features and functions of the devices. The architecture allows devices from any manufacturer to function seamlessly with a home audiovisual system, and which enables other devices from any other manufacturer to augment their functionality. The system of the present invention is extensible, and can be readily modified and advanced as market requirements and technology change. In addition, the system of the present invention implements a standardized, easily extensible method for augmenting the capability and functionality of simpler devices as new, more sophisticated devices are added within a home AV system.

In one embodiment, the present invention comprises a system for providing software-based extended functionality of a target device in a HAVI-compliant home audio-video network. An embedded computer system is built into a host device coupled to the home audio video network, the computer system having a processor coupled to a memory via a bus. The computer system is configured to enable proxy control of a target device coupled to the home audio video network by executing software stored in the memory. The software causes the computer system to implement a DCM (device control module) which includes at least a first and second FCM (functional control module). The DCM is operable for interfacing with and controlling the target device coupled to the havi network. The first and second FCMs are operable for interfacing and controlling a respective first and second functional component of the target device. The DCM has a standardized interface operable to enable proxy control of the target device by an external device coupled to the havi network. The first FCM is a physical FCM operable for controlling the operation of a first functional component of a target device, and the second FCM is a virtual FCM operable for controlling the operation of a second functional component of the target device, wherein the second functional component is a virtual functional component. The virtual functional component is implemented using software executing on the computer system within the host device.

In so doing, the DCM and FCM constructs of the present invention provide a home audiovisual (AV) network with a standardized architecture for inter-operating CE (consumer electronic) devices in a home network. The interoperability aspects of the present invention define an architectural model that allows CE devices from any manufacturer to inter-operate and function seamlessly within the user's home AV system. The virtual FCMs and DCMs of the present invention implement a method of extending a base set of features of existing CE devices with new features and functionality, as new features and new CE devices are deployed within the home AV network.

To implement the above features, the present invention includes an architecture that allows the newly-coupled device to be queried. Using the results of the query, a software based abstraction of that device is generated and made available to other elements in the network. The software abstraction is referred to as a device control module (e.g., a DCM). The device control module provides a predefined, standardized set of interoperability, functionality, and control interfaces for the device. The CE device is coupled to and communicates with the home AV network via a device control module. Each CE device in the home AV system has a corresponding device control module (DCM). The DCM of the present invention also provides an application programming interface (API) to allow other applications to access and manipulate any newly-coupled CE device.

Through the virtual DCMs and FCMs of the present invention, over the life time of the AV system, a mechanism is provided which guarantees that all devices can have their functionality and feature set extended and upgraded from at least some basic minimal level. As more sophisticated devices having more features and greater computational power are added to the AV system, more complex and more feature rich capabilities can be implemented for all of the devices.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention comprises a new architecture of virtual FCMs and virtual DCMs for a home audiovisual system. The virtual FCM and DCM architecture of the present invention provides an architecture for an open, inter-operating, audiovisual system for devices within a home network which provides for easy extensibility of the features and functions of the devices. The architecture allows devices from any manufacturer to function seamlessly with a home audiovisual system and enables other devices from any other manufacturer to augment their functionality. The system of the present invention is extensible, and can be readily modified and advanced as market requirements and technology change. In addition, the system of the present invention implements a standardized, easily extensible method for augmenting the capability and functionality of simpler devices as new, more sophisticated devices are added within a home AV system. The system of the present invention, its operation with the havi architecture, and its benefits are described in the discussions which follow.

Notation and Nomenclature

Figure 2:
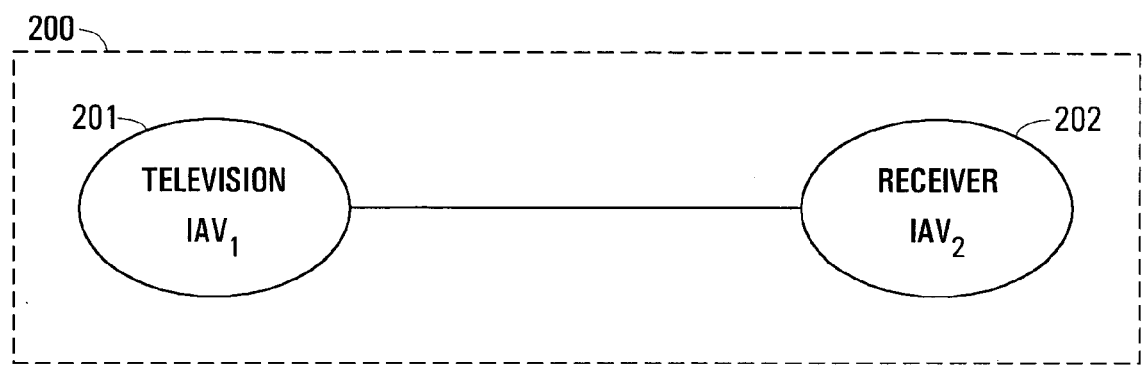
FIG. 2 shows an exemplary peer to peer, two IAV (intermediate audio video) node network in accordance with one embodiment of the present invention.

Some portions of the detailed descriptions which follow are presented in terms of procedures, steps, logic blocks, processing, and other symbolic representations of operations on data bits within a computer memory (see FIG. 2). These descriptions and representations are the means used by those skilled in the data processing arts to convey most effectively the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "computing," "translating," "instantiating," "determining," "displaying," "recognizing," or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission, or display devices.

HAVI Architecture Overview

The Home Audio Video Interoperability (HAVI) architecture provides the functional framework within which the virtual FCMs and DCMs of the present invention operate. HAVI provides for the creation of a Home AV system which provides for seamless support of new devices and problem-free interoperability of devices in a home AV network. The most basic components of a HAVI system in accordance with the present invention are: a home AV interoperability architecture, a series of home AV interoperability interfaces, and a home AV network. The home AV interoperability architecture is a broad, over arching term encompassing the physical network and the controlling programming interfaces. Interoperability interfaces is a term used to describe the interactions and interfaces of the components of the AV architecture. In addition to providing a common command set, the interoperability interfaces provide a software architecture which allows new devices to be integrated into the network and provide their services in a seamless manner. The home AV network is the term used to describe the physical network and its topology.

It should be noted that the home AV interoperability (HAVI) architecture of the present invention (e.g., with which the present invention is compliant) is an open, platform-independent, architecturally-neutral network that allows consumer electronics manufacturers and producers to provide inter-operable appliances. It can be implemented on different hardware/software platforms and does not include features that are unique to any one platform. The interoperability interfaces of the HAVI architecture are extensible and can be added to, modified and advanced as market requirements and technology change. They provide the infrastructure to control the routing and processing of isochronous and time-sensitive data (e.g., such as audio and video content).

Specifically, the HAVI architecture provides: an execution environment supporting the visual representation and control of appliances; application and system services; and communication mechanisms for extending the environment dynamically through plug and play, or otherwise.

It should be noted that the HAVI architecture supports legacy appliances (e.g., appliances that already exist and are available to users). This is important since the transition to more intelligent networked appliances is going to be slow. Most manufacturers will not suddenly begin producing only "intelligent" appliances, and most consumers will not quickly begin replacing all of their existing appliances.

In accordance with the present invention, there are two classes of legacy appliances. A first class includes "one-way" or unacknowledged control appliances. A second class includes controllable "two-way" appliances. Examples of one-way appliances are audio/video components controlled by infrared commands of a hand held remote. Two-way appliances provide confirmation of command execution, status and error reporting. Examples of two-way appliances include the recent introduction of well known IEEE 1394 enabled digital cameras.

It should be noted that the home AV network (hereafter HAVI network) of the present invention provides support to accommodate future appliances and protocols through a write-once, run-everywhere common language. In accordance with the present invention, each appliance includes within it self-describing information concerning the user interface and the device control that can be used by an external controller. This information is specified as programs in the common language.

As described below, the underlying structure for such a network consists of a set of interconnected clusters of appliances. Typically, there will be several clusters in the home, with one per floor, or per room. Each cluster will work as a set of interconnected devices to provide a set of services to users. Often, one device will act as a controller for a set of other devices. However, the architecture is sufficiently flexible also to allow a home to consist of a single cluster with no master controller.

For example, in one embodiment of the present invention, an intelligent television in the family room of a user's home might function as the controller for a number of interconnected appliances. Each of the controlled appliances would have self-describing data and possibly some associated control code. When these appliances are first connected, the controller obtains the user interface and the control program for the appliance. An icon representing the appliance may then appear on the television screen, and manipulating the icon may cause elements of the control program to actuate the represented appliance or appliances in prescribed ways. The exceptions to this model are legacy devices which will have neither self-describing data nor control code. For additional descriptions and related art regarding self-describing data, the reader is referred to Ludtke, et al., A METHOD AND APPARATUS FOR INCLUDING SELF-DESCRIBING INFORMATION WITHIN DEVICES, application Ser. No. 09/092,703, filed on Jun. 4, 1998, which is incorporated herein by reference.

It should be noted that the HAVI network of the present invention supports "Plug and Play" consumer appliances that are easy to install and that provide a significant portion of their value to the user without any action on the user's part beyond physically connecting the cables. This is in distinction to existing appliances that require configuration to provide some major portion of their functionality. The goal is to offer 'hot' plug and play (not requiring the user to switch off appliances) where the connection method supports it safely and reliably.

In accordance with the present invention, an appliance configures itself and integrates into a system-wide "look and feel" user interface without user intervention. Low-level communication services provide notification when a new appliance is identified on the AV network. While there will often be settings which the user may change to suit his or her preferences, the appliance does not require the user to do so in order to offer basic functionality.

It should also be noted that the HAVI network of the present invention is flexible and supports multiple user interfaces, adapting to both the user's needs and the manufacturers need for brand differentiation. In the AV network, protocols scale gracefully from very resource-rich, intelligent PC-like appliances to "dumb," resource starved appliances (e.g., a coffee maker or thermostat). To achieve this, the AV architecture allows low-end appliances to use the resources of more intelligent appliances in well-defined ways. In a similar manner, the AV architecture allows the specification of aggregate appliances where an abstract appliance is created from a logical collection of several lower-level appliances.

And additionally, it should be noted that the HAVI network of the present invention supports existing standards. The HAVI network is complementary to several existing, well known, industry standards and technologies including: CEBus, Home Plug and Play, EHSI, VESA, Home Network, DAVIC, CoMMeND, Lonworks, USB, IEEE 1394, etc. Accordingly, one goal of the present invention is to provide an infrastructure into which existing devices can fit.

The System Model of the HAVI Architecture

Figure 1A:
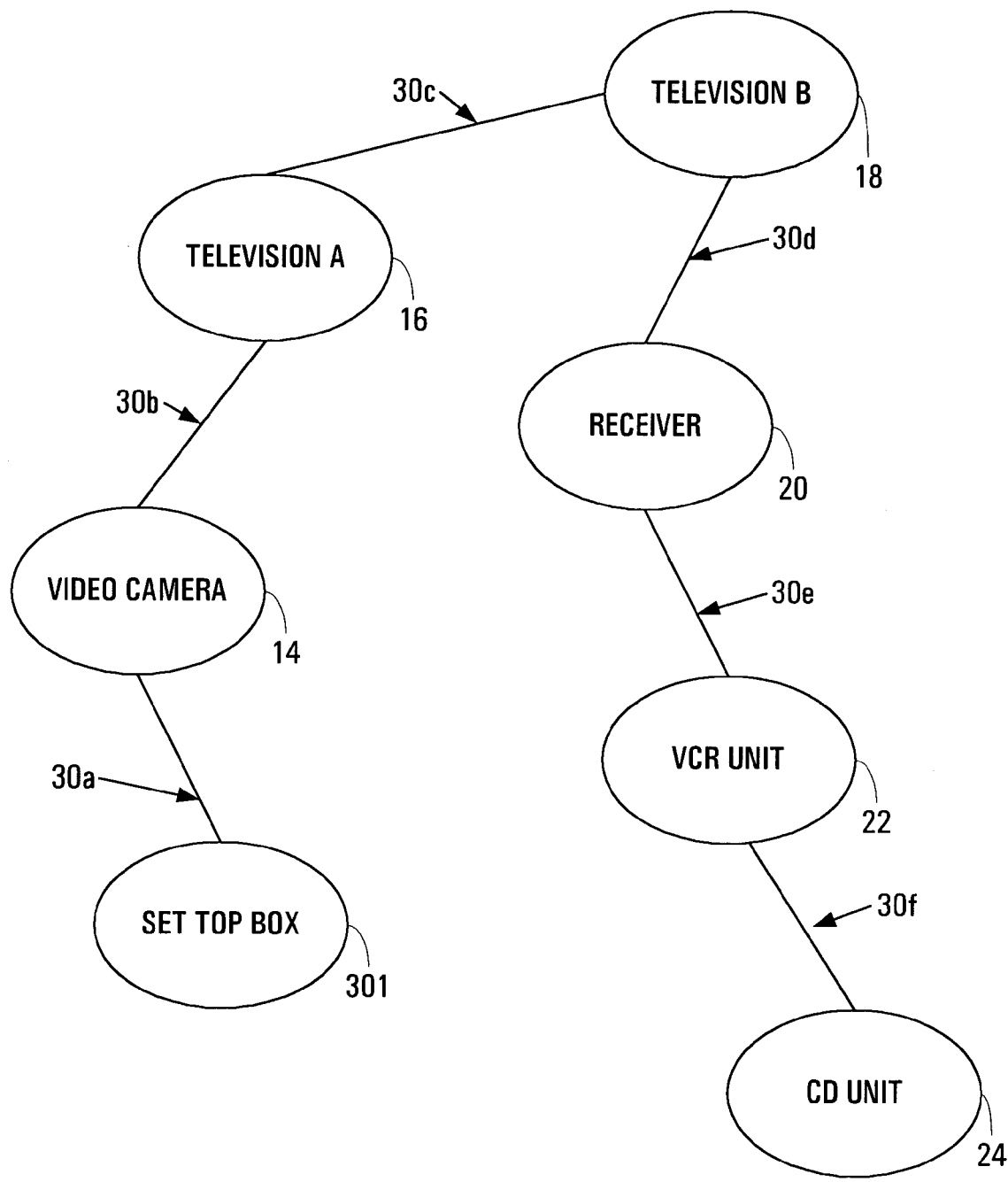
FIG. 1A shows a home AV network in accordance with one embodiment of the present invention.

With reference now to FIG. 1A, a HAVI network 10a in accordance with one embodiment of the present invention is shown. As described above, the HAVI architecture supports a wide range of devices including intelligent receiver/decoders (IRDs), for example, the set top box 301, digital video tape records (DVTRs), video cassette recorders (VCRs), personal computers (PCs), digital video disk players (DVDs), etc., communicating via a common messaging system. FIG. 1A illustrates the physical port-to-port connecting configuration 10a of an exemplary HAVI network. CE devices ("devices") 12–24 are shown connected together with bus segments 30a–30f. In one embodiment of HAVI, the IEEE 1394 serial communication bus standard is used as a platform to provide the common messaging system.

Figure 1B:
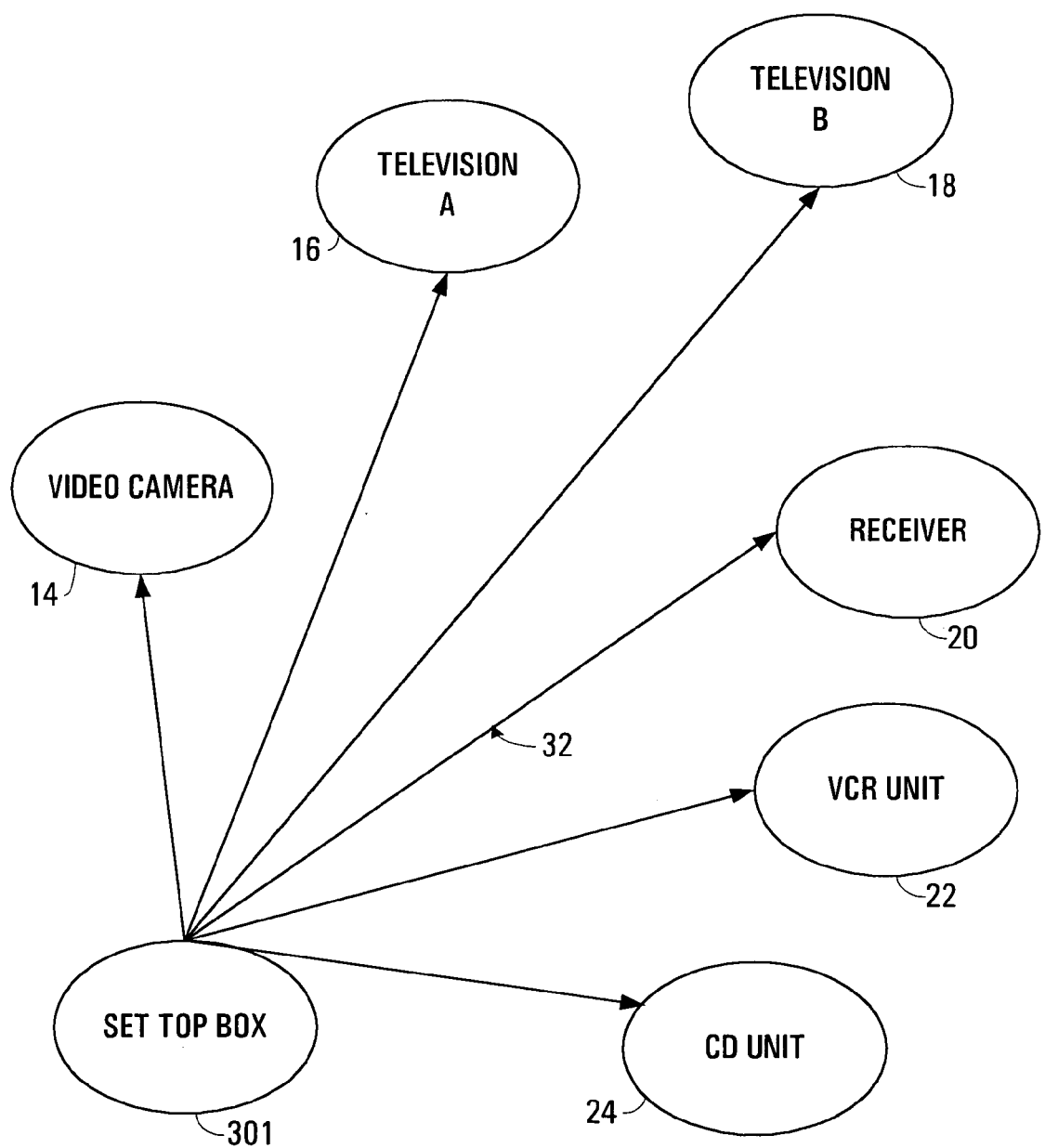
FIG. 1B illustrates a logical bus configuration of the HAVI network of FIG. 1A.

FIG. 1B illustrates a logical bus configuration 10b of the HAVI network of FIG. 1A. As shown in FIG. 1B, all of the devices 12–24 of the HAVI network can be viewed as logically coupled to a common IEEE 1394 serial communication bus 30. Within this bus configuration 10b, peer-to-peer device communication is supported. For example, as shown in FIG. 1C, any device (having appropriate capabilities), e.g., device 12, can send or receive communication packets from any other device in the HAVI network. In the example of FIG. 1B, the set-top-box (e.g., an IRD) can receive messages from or generate messages to any of the other devices 14–24 of the HAVI network.

Referring still to FIGS. 1A and 1B, as described above, the interoperability model in HAVI provides for the following: 1) support for existing devices; 2) a default control model; 3) a means to extend the default control model when new devices or functionality are brought to market; and 4) a common means for device representation (e.g., graphics user interfaces). To achieve the above, the HAVI architecture defines three types of nodes in the home network: Full AV nodes (FAV), Intermediate AV nodes (IAV) and Base AV nodes (BAV).

A FAV node is a device that contains a complete instance of the AV software model (described in detail below). This type of node generally has a richer set of resources and is capable of supporting a complex software environment. The primary distinguishing feature of a FAV is that it is able to take control of the responsibility for less sophisticated devices and does this by loading a control module, usually from the less sophisticated device, and executing it locally. Examples of such nodes would be Set Top Boxes (e.g., set top box 301), Smart TVs, general purpose home control devices, or even Home PC's.

IAV nodes are generally lower cost devices that have limited resources. They do not provide an execution environment for control modules and so can not act as master controllers within the home network. Because they have limited resources, they can access remote resources in one of two ways: by working with other IAV devices which provide some capability they lack, or by using an FAV node which supports a control module to control the IAV nodes. In this second mode of operation they rely on full AV nodes to provide such facilities as a display device, general purpose compute resources, and some overall control framework. This allows FAV devices to bind a variety of IAV devices together to provide a service or abstraction to the user.

Base nodes are nodes that are neither FAV or IAV nodes. These are two generic types: Legacy base nodes and other base nodes. Legacy base nodes are devices that were built before the advent of the HAVI architecture. These devices often use proprietary protocols for their control and quite frequently have a simple, well defined, control only protocol. Such devices can work in the HAVI network but require that a FAV node act as a gateway. Communication between a Full or Intermediate AV node and legacy devices requires that the Home AV commands used in the HAVI architecture be translated to and from the legacy command protocol. Other base nodes are devices that, for business or resource reasons, choose to implement future proof behavior using uploadable control software and do not carry any of the HAVI architecture or the message communication system. These devices will be controlled by an FAV node with a private command protocol between FAV and BAV node.

With the exception of legacy nodes, each node has, as a minimum, enough functionality to allow it to communicate with other nodes in the system. During the course of interaction, nodes exchange control and data information to enable devices to inter-operate and will do so in a peer-to-peer fashion. This ensures that, at the communication level, no one device is required to act as a master or controller for the system. However, it also allows a logical master or controller to impose a control structure on the basic peer-to-peer communication model. Services in the HAVI network are provided by one or more nodes communicating among themselves to deliver a service to a user or an application. Where it is necessary for a node to interact with a user, the node negotiates with other nodes to access and use a display device.

Additionally, it should be appreciated that a distinction is made between Logical and Physical nodes. A good example of this distinction can be found in a normal TV set. Although the TV set is generally one physical box, it contains several functional components, e.g. the tuner, audio output etc. From the system point of view, a physical node is an addressable peer node in the system. If the TV is constructed in such a way that its individual functional components are individually addressable, then it is logically one node and physically several nodes. Conversely, if it is constructed to have one addressable entity, then it is both a single logical node and a single physical node.

The IAV devices and FAV devices communicate by sending messages over the home network using a generic message passing system. When new devices join the home network, they are recognized and added to a global name database (registry). The registry holds information about their characteristics and provides a reference to a handler for that device. Other devices and services are able to query the registry to locate a device and then using the handler, can interact with the device. For additional descriptions and related art regarding the communication and identification processes of the present invention, the reader is referred to Ogino, et al., "METHOD AND SYSTEM FOR PROVIDING A DEVICE IDENTIFICATION MECHANISM WITHIN A CONSUMER AUDIO/VIDEO NETWORK", a U.S. patent application filed on 6, Jan. 1998, which is incorporated herein by reference.

When a device is initially added to the home network, the system queries the device to ascertain its characteristics and capabilities. Once a device's characteristics are known, the architecture provides two methods of controlling it. The first method, level 1 interoperability uses a predefined message set. All IAV and FAV nodes can use this command set to access and control other devices (BAV nodes, because they are deployed before the architecture was defined, are controlled using legacy protocols). The BAV provides a default level of control. The FAV nodes act as control nodes and create a local representation of the BAV node, known as a device control module (DCM) that provides an API used to send control commands to the device.

Level 2 interoperability within HAVI goes farther and supports future-added functionality and new devices. To achieve this, a particular device can carry within its ROM, an uploadable DCM that is uploaded from the IAV device to the FAV device and replaces the default DCM for the particular device. This uploadable DCM not only contains the basic level 1 command set for the particular device but also includes vendor-specific commands to control advanced features of the device. The model allows the device to inform another about its particular functionality. Since the uploadable DCM may be loaded onto any vendor's FAV, the format of the DCM is architecture-neutral.

To allow one device to discover the capabilities of another device and to determine which command set to use with that device, a standard device description structure called the self-describing data (SDD) structure is provided. The SDD structure is extensible. It can be a small number of bytes describing the device type, e.g., TV, or VTR, etc. Alternatively, the SDD structure can be a more complex structure also defining the uploadable DCM and a graphical representation of the device. The graphical representation within the SDD structure allows an FAV node to present a pictorial representation of the devices in the home network to users. By defining the graphical representation in a sufficiently generic manner, a device's SDD graphical data can be used in any vendor's product to display a user interface for that device. This provides an enhanced level of vendor interoperability and also allows a vendor to differentiate a product while maintaining the general look and feel of the display device. This enables a control device (the FAV node) to present a general control user interface for all devices in the home network, irrespective of the differences in type and vendor.

As described above, Legacy devices are devices that were built before the HAVI architecture or devices that select not to use HAVI. HAVI supports Legacy devices by providing Legacy DCMs to provide protocol conversions for Legacy devices. These Legacy DCMs can contain sufficient knowledge to allow them to support an existing 1- or 2-way control protocol and to provide a specific control interface to the devices that conform to HAVI. A legacy DCM acts as a bridge between the Legacy and HAVI devices. This approach allows HAVI also to interact with any future device control protocols such as protocols being used for home energy management or security.

It should be appreciated that the communications hardware and protocols used by the HAVI architecture are non-specific. The HAVI architecture is readily suited to the incorporation and use of any one of several communications media, with the simple requirement that the medium provides a generic communication mechanism that supports the HAVI interfaces. The basic model assumed is one of a logical communications back plane (e.g., IEEE 1394). All AV devices are assumed to be connected to this back plane and can locate and communicate with all other AV devices, as shown in FIG. 1B. In a physical setting, it is likely that this logical back plane will consist of more than one physical communication medium. It is further assumed that multiple protocols may be in use on different physical media. The Home AV architecture abstracts above all of this and presents a generic model of communicating nodes. It will provide a mechanism above the Transport layer (functionally like a socket) to ensure network transparency. This mechanism can be described as "reliable, ordered datagram service" which will provide all fragmentation and re-assembly.

Accordingly, a goal of the present invention is to support each and every physical bus equally, such that an application need not care which physical transport it is using. However, with the familiarity of IEEE 1394 in the electronics industry, features of the present embodiment are illustrated and described in view of functioning with IEEE 1394. Other buses such as CEBus and USB may not require all the same features.

Referring now to FIG. 2, an exemplary peer-to-peer, two IAV node HAVI network 200 in accordance with one embodiment of the present invention is shown. HAVI network 200 includes a first IAV 201 (e.g., a television) coupled to a second IAV 202 (e.g., a receiver). IAV 201 and IAV 202 behave in a peer-to-peer manner, arbitrating for necessary resources between one another. They lack the resources to support the addition of a BAV or IAV device, but can perform meaningful activities within their context. The IAV is not required to provide any standard User Interface (UI) capability. There is no provision in the AV Architecture for "forward compatibility" or discovery of new functions (e.g. IAV 201 only knows the functions that IAV 202 supports based on SDD provided upon connection of IAV 202). However, in accordance with the present invention, the features of the SDD can be easily exploited to perform "ad-hoc" feature discovery.

Figure 3:
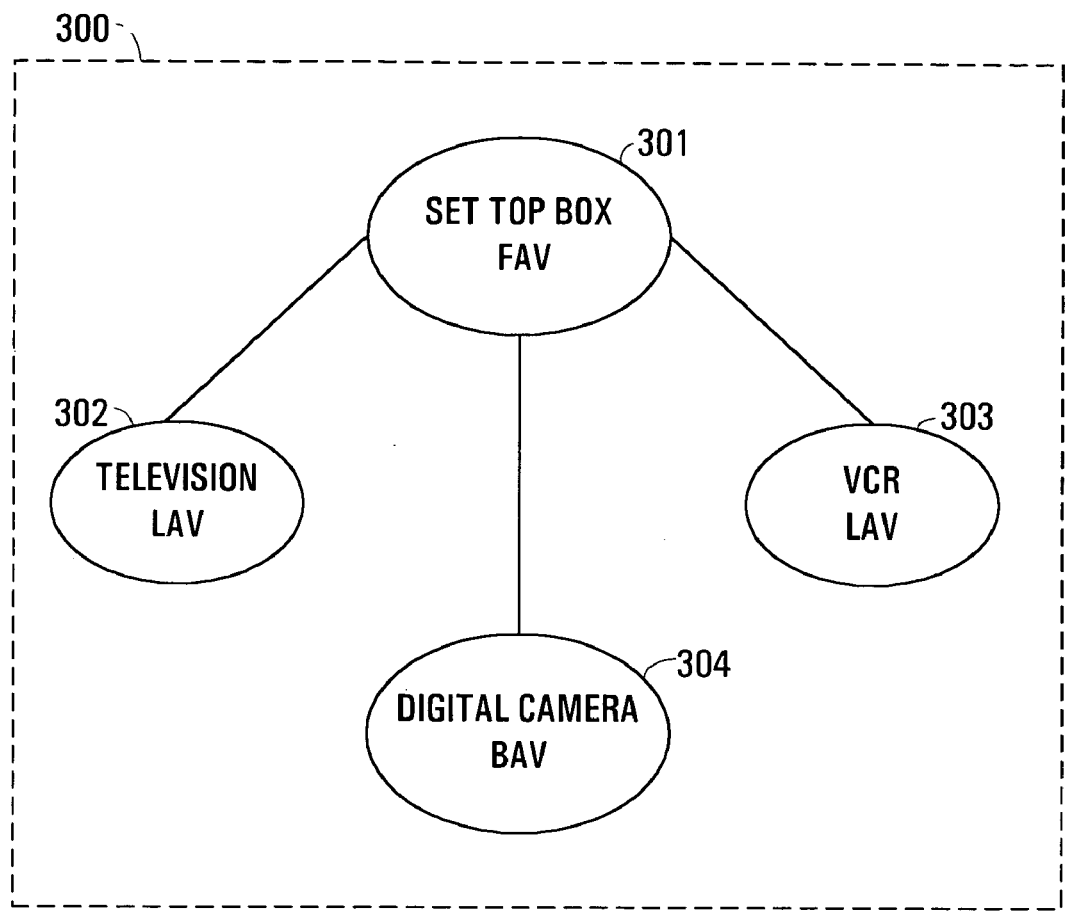
FIG. 3 shows a single FAV (full audio video) cluster HAVI network in accordance with one embodiment of the present invention.

FIG. 3 shows a single FAV cluster HAVI network 300 in accordance with one embodiment of the present invention. HAVI network 300 includes an FAV 301 (e.g., a set top box) respectively coupled to a first LAV 302 (e.g., a television), a second LAV 303 (e.g., a VCR), and a BAV 304 (e.g., a digital camera). In HAVI network 300, FAV 301 controls Legacy and BAV devices (e.g., devices 302–304), providing cluster-wide services.

Figure 4:
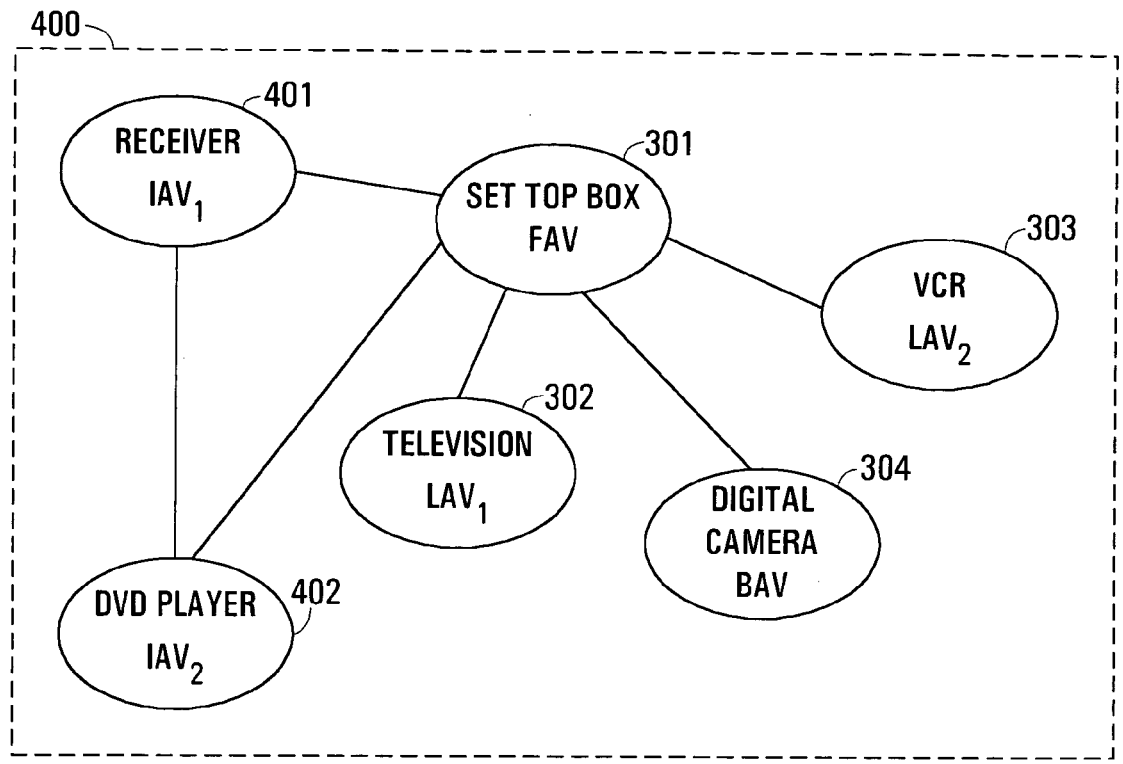
FIG. 4 shows an FAV cluster integrated with an IAV peer to peer HAVI network.

FIG. 4 shows an FAV cluster integrated with an IAV peer-to-peer HAVI network 400. In accordance with the present invention, the configuration of HAVI network 400 provides support for legacy devices 302 and 303 while enabling independent control to occur within the two IAV devices 401 and 402 when their resources are not in use by the set top box 301 (e.g. FAV). The IAV devices 401 and 402 behave as peers to the set top box 301. For efficiency, a resource conflict policy can be implemented for both FAV to FAV or FAV to IAV resource requests. The IAV will be controlled by the FAV by via a DCM running in set top box 301.

Figure 5:
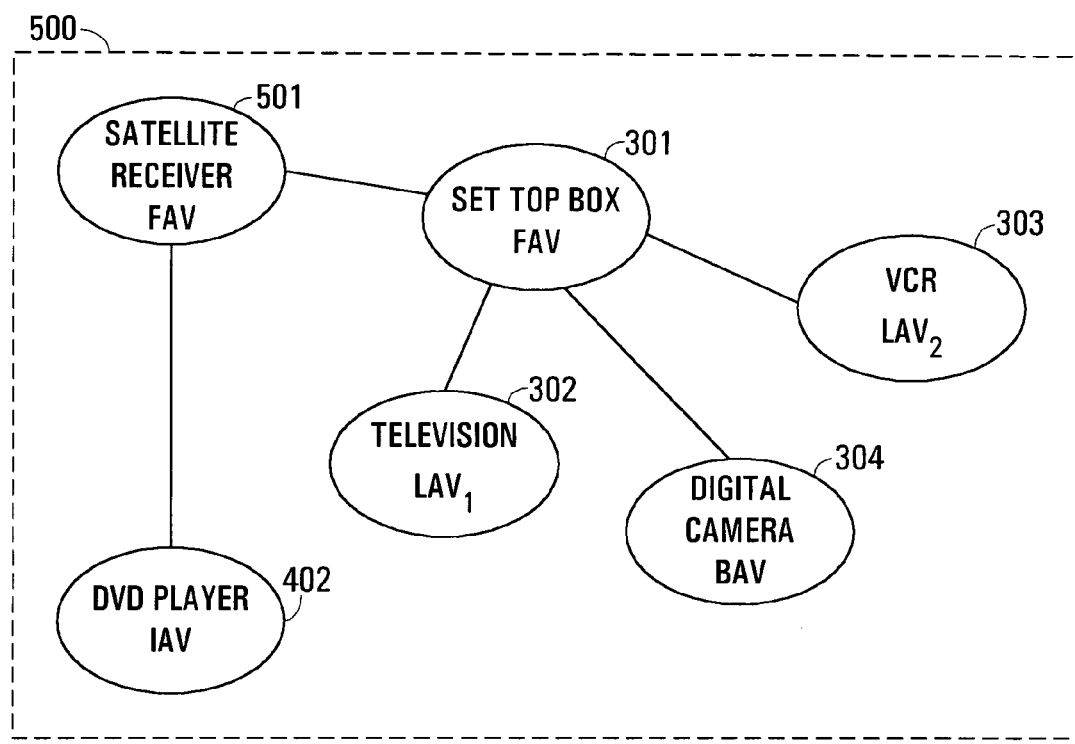
FIG. 5 shows an exemplary HAVI network having multiple FAVs.

FIG. 5 shows an exemplary HAVI network 500 having multiple FAVs. HAVI network 500 includes an additional FAV 501 (e.g., a satellite receiver). This configuration behaves in a similar manner to HAVI network 400 described above. In this configuration, the set top box 301 and 501 act as peers.

The Computer System Platform

Figure 6:
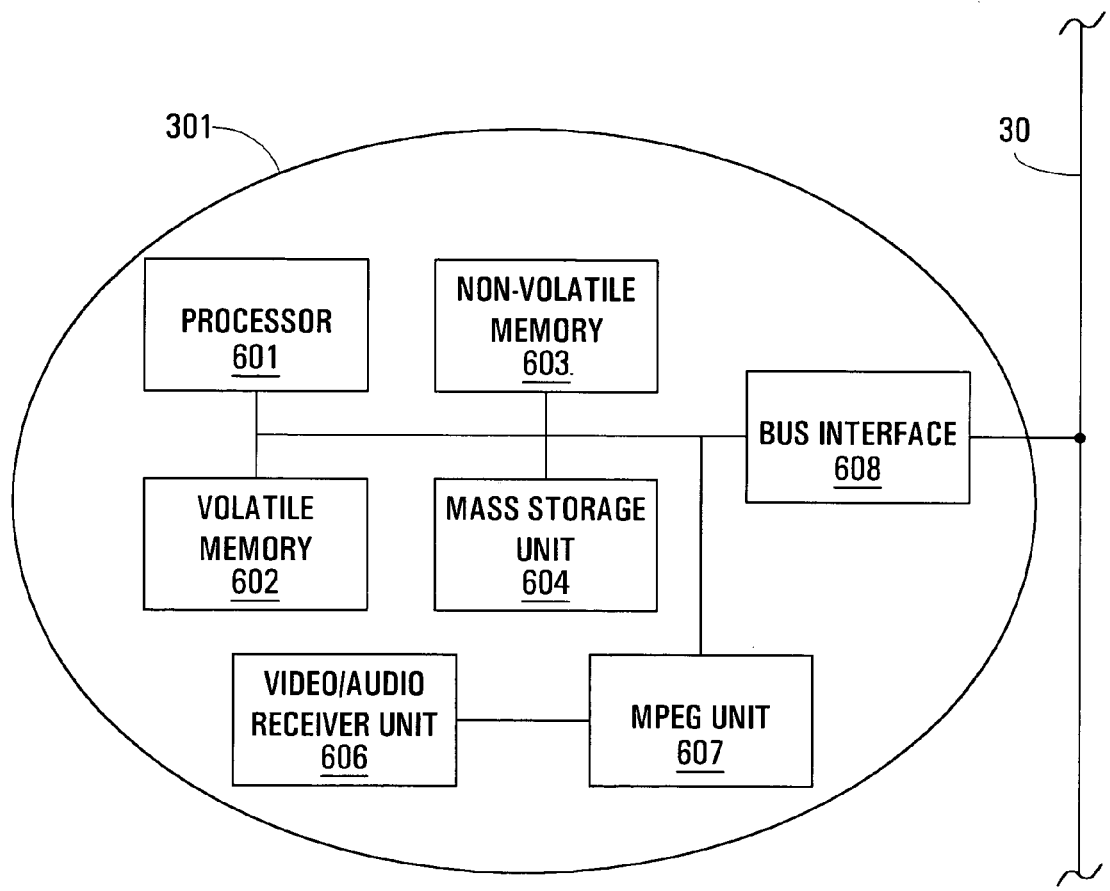
FIG. 6 shows a diagram of a set top box in accordance with one embodiment of the present invention.

With reference now to FIG. 6, a diagram of a set top box 301 in accordance with one embodiment of the present invention is shown. As described above, any consumer electronics device can be a FAV and thereby provide a computer system platform for HAVI software. For instance, the set-top-box 301 device of the exemplary HAVI network contains special components that provide an operation platform for software components of the HAVI architecture which are described below. Specifically, aspects of the present invention, described below, are discussed in terms of steps executed on a computer system (e.g., processes shown in FIGS. 13 through 17A). Although a variety of different computer systems can be used with the present invention, an exemplary general purpose computer system is shown in the set-top-box of FIG. 6.

Set-top-box 301 of FIG. 6, in addition to having a video/audio receiver (decoder) unit 606 and MPEG unit 607 also includes an address/data bus 600 for communicating information, one or more central processors 601 coupled with the bus for processing information and instructions, a volatile memory 602 (e.g., random access memory RAM) coupled with the bus 600 for storing information and instructions for the central processor 601 and a non-volatile memory 603 (e.g., read only memory ROM) coupled with the bus 600 for storing static information and instructions for the processor 601. Set-top-box 301 can also optionally include a data storage device 604 ("disk subsystem") such as a magnetic or optical disk and disk drive coupled with the bus 600 for storing information and instructions. Also included in the set-top-box 301 is a bus interface unit 608 for interfacing with the local bus 30 (e.g., an IEEE 1394 serial bus). Set-top-box 301 can operate under a variety of different operating systems (e.g., Windows operating system, DOS operating system, Macintosh O/S), but in the present embodiment the Aperios operating system is used.

The HAVI Software Model

In accordance with the present invention, the computational units of the HAVI architecture (e.g., DCMs) are modeled as objects. Each object is a self contained entity, accessible through a well-defined interface and executing within a well-defined software execution environment. The software execution environment (e.g., set top box 301 from FIG. 6) provides a set of well-defined services (locally or remotely) that are also modeled as objects and can be accessed, using the communications infrastructure, via their well-defined interfaces.

Each object is uniquely named. No distinction is made between objects used to build system services and those used for application services. All objects make themselves known via the registry. Objects in the system can query the registry to find a particular service or device and can use the result of that query to send messages to that service or device. The identifier assigned to an object is created when the object registers. This identity, if required, is guaranteed to be persistent during the lifetime of the object and will remain persistent even in the face of a complete reboot of the home network.

In accordance with the present invention, the objects communicate using a message passing model. An object that wishes to use the service of another object, does so by using a general purpose message passing mechanism that delivers the service request to the target object. The target object is specified using the unique object identifier discussed above. While in the present embodiment the message passing mechanism functions with IEEE 1394, it should be noted that there is no distinction between sending a message across a IEEE 1394 bus, or over a Control A1 link. In the same manner, there is no distinction between objects on the same node and one on a remote node. The actual implementation of the message passing infrastructure will depend on the system and networking environment and will differ from node to node and among vendors. However, the actual format of the messages must be common so that interoperability is assured.

It should be appreciated that the general intent of the object model and messaging system is to provide a completely generic software model that is sufficiently flexible to allow multiple implementations with a variety of software systems and languages. Details of the binding between messages and the code that handles them are left to the system implementor.

Software Architecture Overview

The HAVI software architecture defines the way that the software model is used to support the HAVI architecture. In particular, it defines the way that devices are abstracted and managed within the AV architecture. It defines the ways that interoperability is assured, and it defines the ways that future devices and services can be integrated into the architecture.

Following is a description of FAV nodes as software managers: In accordance with the present invention, FAV nodes act as managers for IAV and BAV nodes and provide a platform for the services that support the HAVI architecture. To achieve this they provide an execution environment which allows objects to control and communicate with services and devices. To ensure that the devices are accessible within the Home AV network, the FAV nodes support a software abstraction of the services that a device offers to others. As described above, this abstraction is referred to as a device control module (DCM). The DCM is modeled as an object within the software architecture but is refereed to hereinafter simply as the DCM to distinguish it. The interface that the DCM exposes to the rest of the system provides the means to access and control that device. In the general case, a FAV will manage a set of DCMs for the home network or portion of the IAV network that it manages. Thus, it should be appreciated that from an interoperability perspective, the primary role of the FAV node is to manage DCMs of the present invention and act as an execution environment for DCMs.

Following is a description of FAV nodes as controller and display device: In accordance with the present invention, in most cases, FAVs will have an associated display device which is used for display of AV content and of UI material. However, the HAVI software architecture does not mandate this and FAV nodes may be "headless." In this case they will cooperate with other nodes to display content and UI information (see below). However, FAV devices will be responsible for supporting the high level UI APIs that provide the look and feel of the entire home network. The lower level graphic manipulation APIs will generally be located close to the graphics display device itself and are manipulated by the FAV high level APIs.

Following is a description of peer-to-peer architecture between FAV nodes: In a Home AV network, in accordance with the present invention, there may be more than one FAV. In this case, each FAV cooperates with other FAVs to ensure that services are provides to the user. This allows FAV nodes to cooperate to share resources. For example, an FAV node that does not have direct access to a display device, may use a remote FAV node to display DCM user interfaces. Alternatively, a FAV node may require the services of a data translation module that exists on a remote node to allow it to set up a data route between two AV devices.

Level 1 and Level 2 Interoperability Generally

In accordance with the present invention, one of the major goals of the HAVI architecture of the present invention is to support interoperability between devices. This includes existing devices and future devices. To achieve that interoperability, the HAVI architecture of the present invention supports a general model that allows two levels of interoperability. These levels are referred to as Level 1 and Level 2.

Level 1 interoperability of the present invention addresses the general need to allow existing devices to communicate. To achieve this, Level 1 interoperability of the present invention defines and uses a generic set of control messages (commands), that enables one device to talk to another device and a set of event messages that it should reasonably expect from the device. To support this approach, a basic set of processes are required. These processes include device discovery, communication, and a generic message set.

The device discovery process of the present invention provides for the fact that each device in the Home AV network needs a well-defined method that allows it to advertise to others its characteristics. The adopted approach is to specify a data structure, required on all FAV and IAV devices, which contains information about the device and which can be accessed by all other devices. This data structure is referred to as a self-describing data structure (SDD). The SDD contains, as a minimum, enough information to allow another device to discover its basic capabilities and so to infer the basic set of command messages, that can be sent to that device, and events it should reasonably expect to receive from that device.

The communication process of the present invention provides for the fact that once a device has determined the capabilities of another device; it then needs to be able to access those capabilities. To achieve that requires a general communication facility that allows one device to send a message containing a command request to another device. The general message service processes of the present invention were discussed above.

Generic message set refers to the process required to support Level 1 interoperability. This includes a well-defined set of messages that must be supported by all devices of a particular class. This ensures that a device can work with other devices, irrespective of the manufacturer, because all devices agree to a common set of generic commands. As discussed above, within the HAVI software architecture of the present invention, these commands are presented as a DCM to the rest of the system.

These three basic processes of the present invention support at least a minimal level of interoperability. Since, in most cases, any device can query the capabilities of another via the SDD, any device can determine the command set supported by another device. And since each device has access to a generic messaging system, any device can interact with any other device.

However, it should be appreciated that level 1 compatibility in accordance with the present invention only ensures that devices can inter-operate at a minimal or degraded level of functionality. The generic message set for each device class is a minimal and common set of commands. The SDD facility offers a means to provide some degree of customization of a device by providing information about its UI and some aspects of its interaction model. Other IAV devices can use this information to present an interface to the device. Alternatively, any FAV device can use this information to customize the generic DCM it has created for the device. However, it should be noted that a more extensible mechanism is also needed to allow a device to communicate to other devices any additional functionality it possesses. Level 2 interoperability of the present invention provides this mechanism. Level 1 and Level 2 interoperability are discussed in greater detail below.

Level 1 and Level 2 DCMs

As described above, the DCM of the present invention functions by providing access, control and interaction with a device. DCMs are typically instantiated (e.g., executed) on the resources of FAVs in the Home AV architecture. The DCM of the present invention provides an interface to a device and manages a UI that the device wishes to present to users.

In accordance with the present invention, with the Level 1 interoperability, the DCMs created for devices are generic. They support a minimal command set that allows generic control of the device. To support device-specific features requires that the DCM provide access to such device-specific features and is capable of presenting device-specific features to users via the UI.

To achieve this, Level 2 interoperability is used. In accordance with the present invention, the Home AV architecture allows a device to provide an uploadable "override" DCM for the generic DCM that would normally be created for that device. The uploadable DCM (e.g., Level 2 DCM) is capable of replacing the default DCM (e.g., Level 1 DCM) on the FAV. It should be appreciated that the Level 2 DCM could be retrieved from a variety of sources. One such source is the SDD of the device itself. In this case, the Level 2 DCM is fetched, received, or otherwise acquired from the SDD of the device and instantiated in an FAV node when the device is installed into the system. Because the Home AV architecture is vendor neutral, it is necessary that the Level 2 DCM work on a variety of FAV nodes, each with potentially different hardware architectures. To achieve this, the format of both the Level 1 and Level 2 DCMs of the present invention is architecture neutral such that a wide variety of software execution environments of the FAV nodes are able to instantiate and run the Level 1 and Level 2 DCMs.

It should be appreciated that, in accordance with the present invention, once created and running within a FAV node, the DCMs of the present invention communicate with the IAV and BAV nodes in the same manner as described above using the basic messaging mechanism.

As described above, there are many permutations of FAV, IAV, and BAV nodes possible within a given HAVI network. These permutations generally fall into two types: HAVI network configurations that support an FAV device, and those that do not. This distinction essentially defines whether a HAVI network will be using a peer-to-peer configuration (e.g., as shown in FIG. 2, where no FAV is present) or will be imposing some form of control hierarchy (e.g., the FAV cluster as shown in FIG. 3).

In accordance with one embodiment of the present invention, in the cases where no FAV is present, only Level 1 interoperability is available, and the devices are forced to use SDD information to discover other IAV capabilities, present those capabilities, and control the device. In the cases where FAVs are present, DCMs are instantiated and used. If these are level 1 (e.g., generic) DCMs, the devices are operating at Level 1 interoperablity. If there is at least one Level 2 DCM present, then some of the devices are operating at Level 2 interoperability.

In accordance with the present invention, it should be noted that a mixed mode of operation is possible in which clusters of devices are inter-operating under control of an FAV node, while other devices are inter-operating in a peer-to-peer fashion. In this manner, the flexibility of the present invention allows vendors the freedom to design and build devices at all points on the cost/capability spectrum with the certainty that these devices will inter-operate seamlessly with other devices in the HAVI network.

Figure 7:
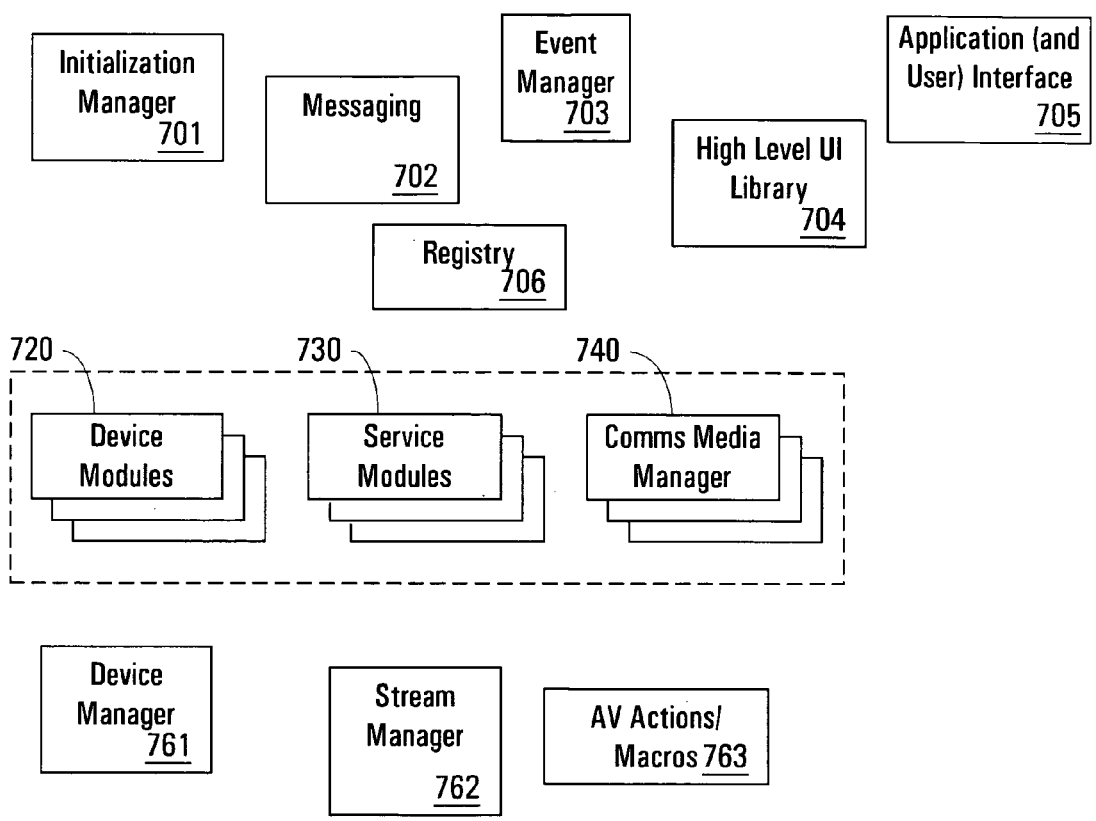
FIG. 7 shows a logical block diagram of one embodiment of the HAVI architecture of the present invention.

Referring now to FIG. 7, a logical block diagram 700 of one embodiment of the HAVI architecture is shown. FIG. 7 shows an overall HAVI architecture in accordance with the present invention. The components shown in diagram 700 are as follows:

Device manager 761 is responsible for creating and managing the DCMs that represent devices managed by an FAV device.

Device Modules 720 are the DCMs for individual devices. As described above, each DCM functions as a control point for a device and provides a UI component and a control component. The DCMs (e.g., device modules 720) provide an API to allow other applications to access and manipulate the devices.

Service Modules 730 can be viewed as software devices. They are DCMs for any software component (as opposed to a hardware device) that provides a general service to other devices or components in the home network.

Comms Media Manager 740 is the component responsible for managing the underlying physical communications process. It provides an API that allows code modules to interact with the features of the communications media (e.g., IEEE 1394).

Registry 706 is a service database. All DCMs for physical devices and software services will register themselves in the registry 706, and all modules (e.g., device modules 720) can query the registry to get a handle for another device or module.

Messaging 702 is a component that provides a basic message passing facility to allow both devices (hardware) and device modules 720 and service modules 730 to communicate with each other.

Event Manage 703 is a module that provides a generic event service. This is a one-to-many communication service allowing notification in the HAVI network.

Initialization manager 701 is the component used as part of the device bootstrap process.

Stream Manager component 762 is responsible for helping services set up routes between devices and device modules. It takes into consideration the 'cost' of transferring data via a particular route, the requirements on data format translation, etc. This component is not needed for the basic architecture.

AV Actions/Macros 763 is the component that is a manager for higher level AV actions which are groups of individual low level commands, e.g. it provides a macro service. This component is not needed for the basic architecture.

High level UI library 704 is the component that provides a set of high-level UI components that are used by device modules 720 to build UIs for their corresponding devices. This component is not needed for the basic architecture.

Application (and User) interface 705 is the component that Following is a description of provides the linkage between a common consumer electronics platform (CCEP) APIs of the HAVI compliant devices and applications which are local or possibly remote. This component is not needed for the basic architecture.

It should be appreciated that the above components as diagrammed in FIG. 7 are abstractions of functionality. They are designed to make clear what functionality is included in the architecture for HAVI compliant devices. In order to avoid unnecessarily obscuring the present invention, the relationship between components 701–763 and the message flows between them are not shown.

Additional details regarding the implementation and interoperability of DCMs within the HAVI architecture can be found in U.S. patent application Ser. No. 09/003,119 "A HOME AUDIO/VIDEO NETWORK WITH TWO LEVEL DEVICE CONTROL MODULES", U.S. patent application Ser. No. 09/003,097 "HOME AUDIO/VIDEO NETWORK WITH BOTH GENERIC PARAMETERIZED DEVICE CONTROL", U.S. patent application Ser. No. 09/003,112 "A HOME AUDIO/VIDEO NETWORK WITH UPDATABLE DEVICE CONTROL MODULES", U.S. patent application Ser. No. 09/003,252 "AUDIO VIDEO NETWORK WITH DEVICE CONTROL MODULES FOR INCORPORATED LEGACY DEVICES", and U.S. patent application Ser. No. 09/003,412 METHOD AND SYSTEM FOR DOWNLOADING APPLICATIONS FOR CONTROLLING DEVICES WITHIN A HOME AUDIO/VIDEO NETWORK", which are each incorporated herein by reference.

Figure 8:
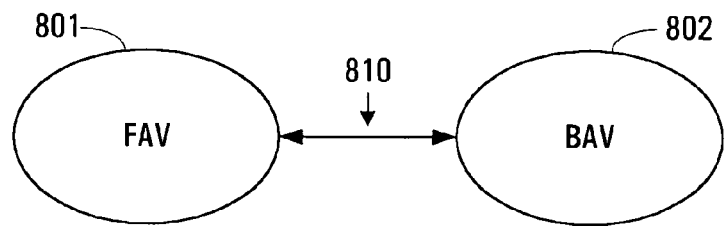
FIG. 8 shows a diagram of a full AV node, a basic AV node, and a connection there-between in accordance with one embodiment of the present invention.

With reference now to FIG. 8, a diagram 800 showing a FAV node 801, a BAV node 802, and a connection 810 there between is shown. As described above, the DCM is a software-based abstraction of a device which provides device-specific functionality to the HAVI software environment and applications. HAVI applications will not communicate with a device directly. Instead, a proxy communication is utilized. Proxy communication as used herein refers to the method wherein HAVI applications communicate with coupled devices by accessing the software based DCM (e.g., or FCM) of any particular coupled device. The DCM functions as a software-based communications and control proxy for the device. As described above, a DCM is a HAVI object in this sense that it is registered in the Registry and can communicate with other HAVI objects via the HAVI messaging system. As described above, DCMs and FCMs are hosted on AV nodes within the HAVI network.

Diagram 800 depicts a FAV node 801 and a BAV node 802 coupled via a communications link 810. FAV node 801 incorporates its respective DCM, and BAV node 802 incorporates its respective DCM. As described above, although AV nodes 801 and 802 both have respective DCMs, the DCMs are not necessarily running on the resources within the AV nodes 801 and 802. In a typical case, both DCMs are running on a FAV node within the HAVI network (e.g., FAV node 801).

Figure 9:
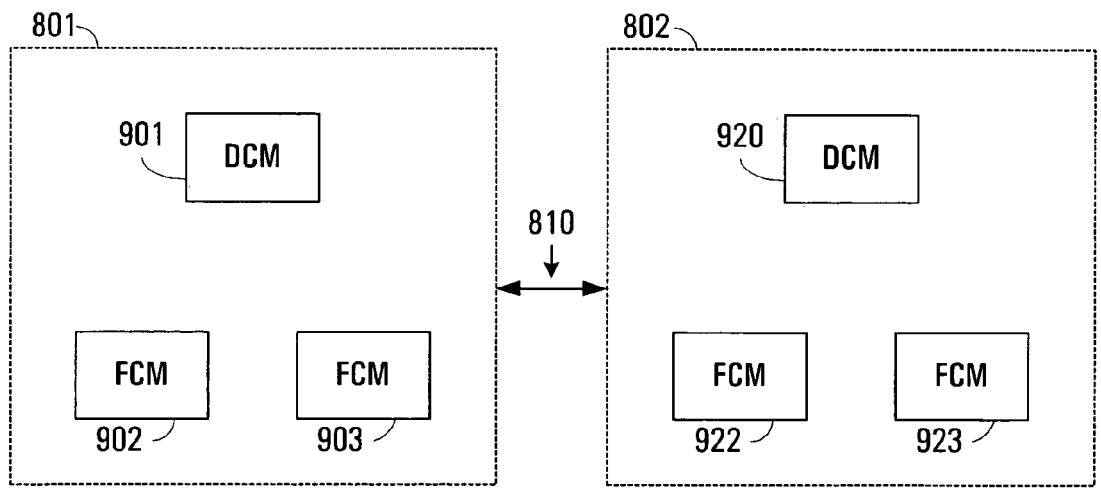
FIG. 9 shows the full AV node and the basic AV node of FIG. 8 with respect to their internal FCMs and DCMs.

Referring now to FIG. 9, FAV node 801 and BAV node 802 are shown with respect to their internal DCMs and FCMs. As depicted in FIG. 9, FAV node 801 includes a DCM 901 which further includes an FCM 902 and an FCM 903. BAV node 802 includes a DCM 921 which further includes an FCM 922 and an FCM 923. In accordance with the present invention, and in accordance with the HAVI specification, an FCM is a software object providing an interface via which applications invoke related operations provided by the respective device. The DCM functions as a "container" for the various FCMs associated with a particular device. The DCM groups the various FCMs which represent the functional components of the particular device. Typically, FCMs refer to hardware resources within a device. For example, in a case where BAV node 802 is a VCR device, BAV node 802 will include one or more FCMs for its various internal functional components. For example, FCM 922 can be associated with controlling the tuning hardware of the VCR, while FCM 923 is associated with the tape drive mechanism of the VCR. Similarly, in the case where FAV node 801 is a set-top box (e.g., set-top box 301 of FIG. 1A), FCM 902 could be associated with the cable television decoding hardware of the set-top box, while FCM 903 is associated with remote control unit for the set-top box.

In both of the above cases, the FCMs (e.g., FCM 902 and 903, and FCM 922 and 923) are associated with physical hardware components of their respective devices. The present invention provides a framework for implementing a virtual FCM which is not associated with any corresponding physical hardware component. Rather, the capability of a "virtual" component is implemented through software. This virtual component is accessed and communicated with as if it were an ordinary physical hardware component. External applications interact with the virtual component in the standardized, HAVI-compliant method. The virtual FCM is incorporated within the DCM framework, and operates therein, in the same manner as a conventional FCM.

Figure 10:
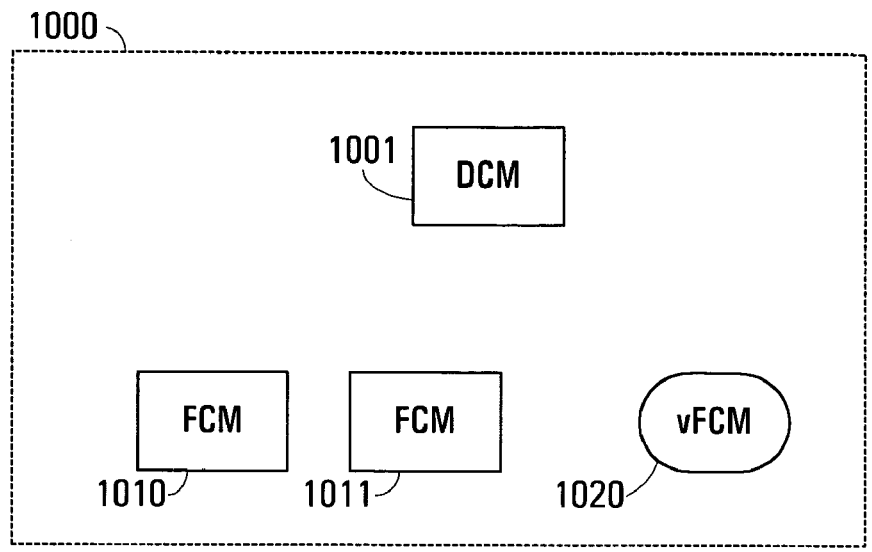
FIG. 10 shows a diagram of a basic AV node incorporating a virtual FCM in accordance with one embodiment of the present invention.

Referring now to FIG. 10, a BAV node 1000 incorporating a virtual FCM 1020 is shown. BAV node 1000 is substantially the same as BAV node 802, however, BAV node 1000 includes a virtual FCM 1020. As depicted in FIG. 10, BAV node 1000 includes a DCM 1001, an FCM 1010, an FCM 1011, and a virtual FCM 1020. As described above, FCM 1010 and FCM 1011 are software objects which provide an interface for respective hardware functional components within the BAV node device 1000. The virtual FCM 1020 provides a software object for interfacing external applications and external devices with the virtual functional component represented by virtual FCM 1020.

The benefit of virtual FCMs is that they allow the processing capabilities of one device to enhance the capabilities of a second device. As described above, DCM can be executing on other FAV nodes within the HAVI network. This "host" AV node can implement various virtual FCMs in software to extend the functionality of the BAV node device. In other words, a fairly simple device (e.g., an audio amplifier BAV node 802) can be made to appear, to applications, as a more complex device (e.g., and audio amplifier which incorporates an equalizer) by the "transparent" addition of software based functionality. As another example, a simple, VCR device having relatively simple features (e.g., delayed recording, delayed playback, and the like) can be augmented to present more complex, more sophisticated features to external applications (e.g., multiprogram recording, sophisticated playback schemes, and the like). In so doing, virtual FCMs of the present invention provide an open, extensible, method of updating and augmenting the functionality of basic devices within a HAVI network.

In addition to implementing software-based virtual functional components for a device, the present invention provides a method of implementing a "virtual device" itself. The present invention provides a method for implementing a virtual DCM by assembling multiple FCMs from different devices and interfacing them as if they were a DCM for an actual physical device. This is depicted below in FIG. 11.

Figure 11:
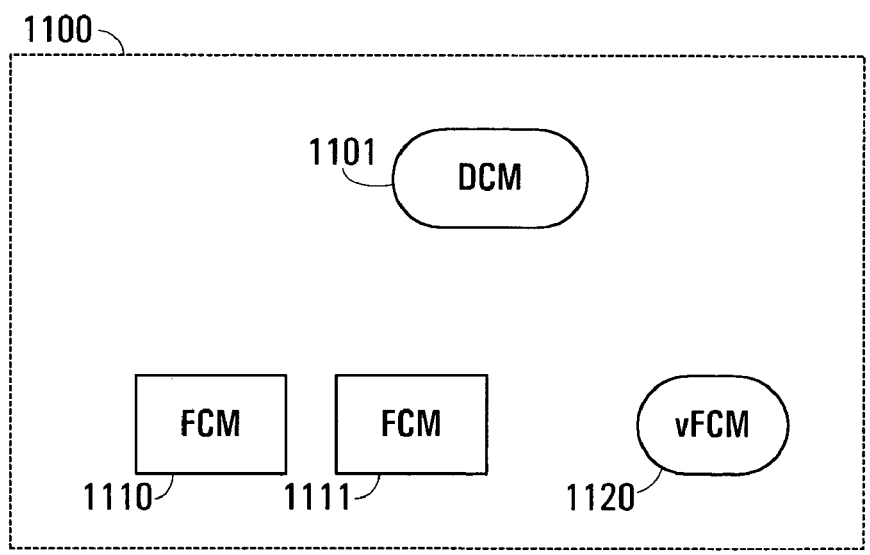
FIG. 11 shows a diagram of a virtual DCM which incorporates physical FCMs and virtual FCMs in accordance with one embodiment of the present invention.

Referring now to FIG. 11, a virtual DCM 1100 is shown. Virtual DCM 1100, software wise, is substantially the same as DCM 1000 of FIG. 10. However, virtual DCM 1100 incorporates various FCMs from other devices (e.g., FCM 1110 and FCM 1111), along with, in this embodiment, a virtual FCM (e.g., virtual FCM 1120). Virtual DCM 1100 functions by assembling FCMs from a set of other devices (and/or their associated software resources) along with virtual FCMs (and the associated virtual components) to implement a virtual device with "new" functionality made up of the functionality of the various FCMs (e.g., FCM 1110, FCM 1111, and virtual FCM 1120).

Thus virtual DCM 1101 provides a much more flexible and much more standardized way of implementing the desired functionality. As opposed to accessing the various devices separately, an external application can access the virtual DCM 1101 to implement to the desired functionality much more efficiently. Even though virtual DCM 1101 incorporates FCMs from various different devices, virtual DCM 1101 is interfaced with, and accessed by, other external applications as if DCM 1101 were a conventional "unitary device" DCM. An external application can access DCM 1101 alone as opposed to assembling its desired functions by accessing the various, multiple FCMs.

For example, a relatively sophisticated device, such as an audio mixer, can be assembled out of the various FCMs of less complex, relatively simple devices. For example, in a mixing board, various different audio signals are received as inputs for combination, mixing, overlay, and the like. Instead of representing the audio mixer with various FCMs and DCMs which represent its various functions, the present invention provides the capability of assembling the required FCM and DCM functions and building a single DCM for interacting with and controlling the functionality of an ideal mixer. This provides a much more simple interface for external applications. In essence, the virtual DCM (e.g., virtual DCM 1101) assembles the various FCMs and DCMs representing the various functions of the audio mixer and "wraps" them within a HAVI specification compliant DCM API.

Figure 12:
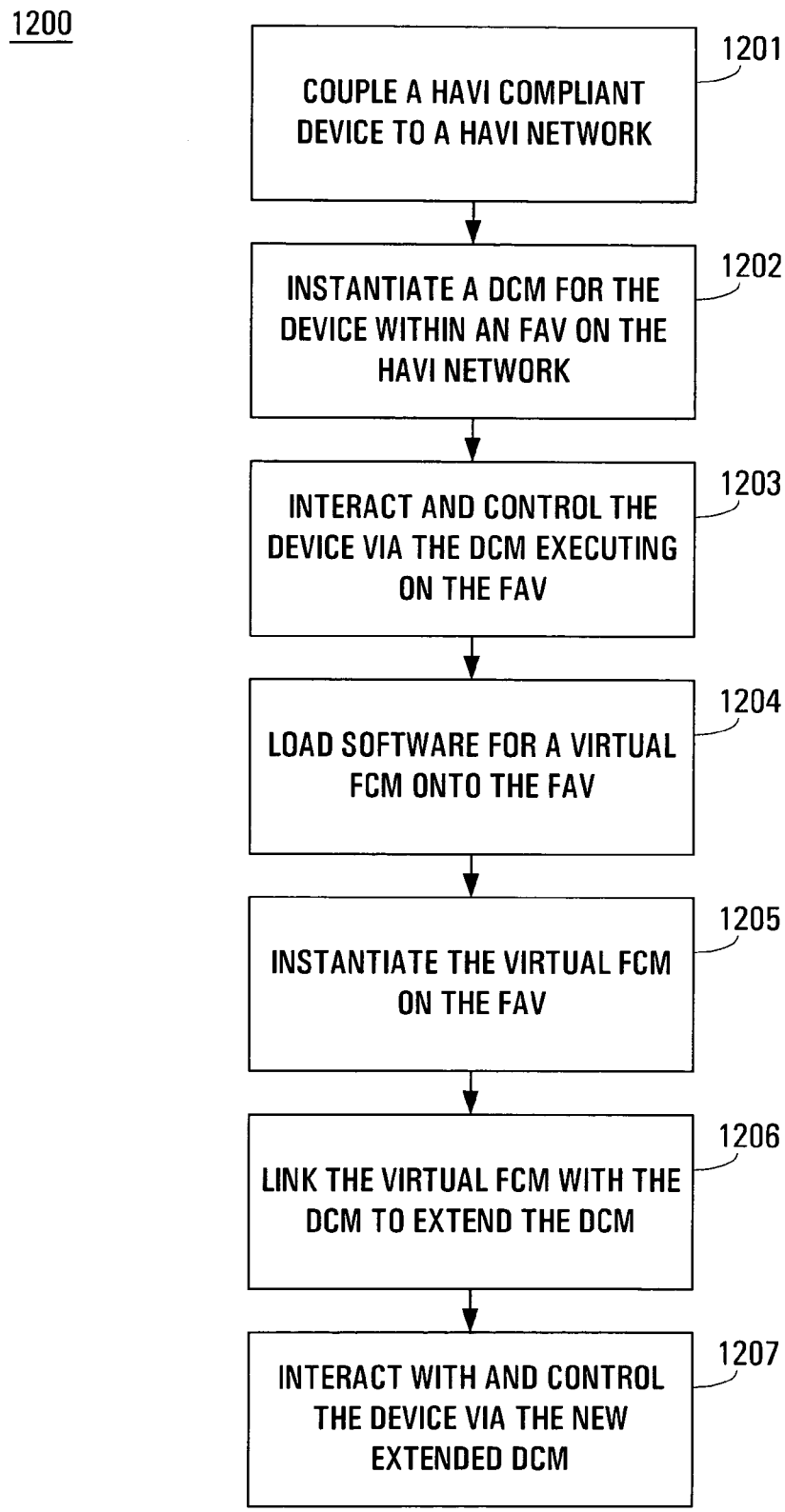
FIG. 12 shows a flow chart of the steps of a process of extending a DCM using a virtual FCM in accordance with one embodiment of the present invention.

With reference now to FIG. 12, a flow chart of the steps of a process 1200 for extending a DCM using a virtual FCM in accordance with one embodiment of the present invention is shown. Process 1200 shows the steps involved in extending a HAVI compliant device with new functionality via the virtual FCM process of the present invention.

Process 1200 begins in step 1201, were a HAVI-compliant device is coupled to a HAVI network. As described above, this device can be a BAV device (e.g., device 802 of FIG. 8), including a BAV node (e.g., BAV node). The device is coupled to the HAVI network via the physical transport layer, which is typically implemented in IEEE 1394 (e.g., as depicted in FIG. 1A). In step 1202, a DCM for the device is downloaded across the network and instantiated within a FAV node (e.g., device 801 of FIG. 8) on the HAVI network. In step 1203, external software applications and external devices interact in control of the newly-coupled device via the instantiated DCM executing on the FAV node. This enables proxy control of the newly coupled device, whereby external applications and external devices interact with the device via its respective DCM.

Referring still to FIG. 12, the present invention provides for extending the capabilities of the BAV device via the mechanism of virtual FCMs. As described above, the virtual FCM provides a software-based abstraction of new functionality which, in this case, is implemented by the computer resources oh the FAV node hosting the DCM. Thus, to extend the functionality of the BAV device, in step 1204, software for the virtual FCM is loaded onto the FAV device. This software can be accessed for uploading through numerous possible means, such as for example, downloading new software via the Internet, having the user insert new software via removable storage (e.g., floppy disk), or other similar means. In step 1205, the FAV node accesses and executes the software, thereby instantiating the virtual FCM within its embedded computer system. In step 1206, the virtual FCM is linked to the DCM such that it can be accessed and interacted with using standard HAVI network protocols. By linking the virtual FCM into the DCM for the newly coupled device, the functionality and capability of the device has been extended to incorporate the new functions specified by the loaded software. Thus, in step 1207, the other external applications and external devices on the HAVI network interact with and control the device via the new extended DCM. The external applications and external devices utilize the capability of the virtual FCM as if it were an ordinary physical FCM, corresponding to physical hardware within the device.

Figure 13:
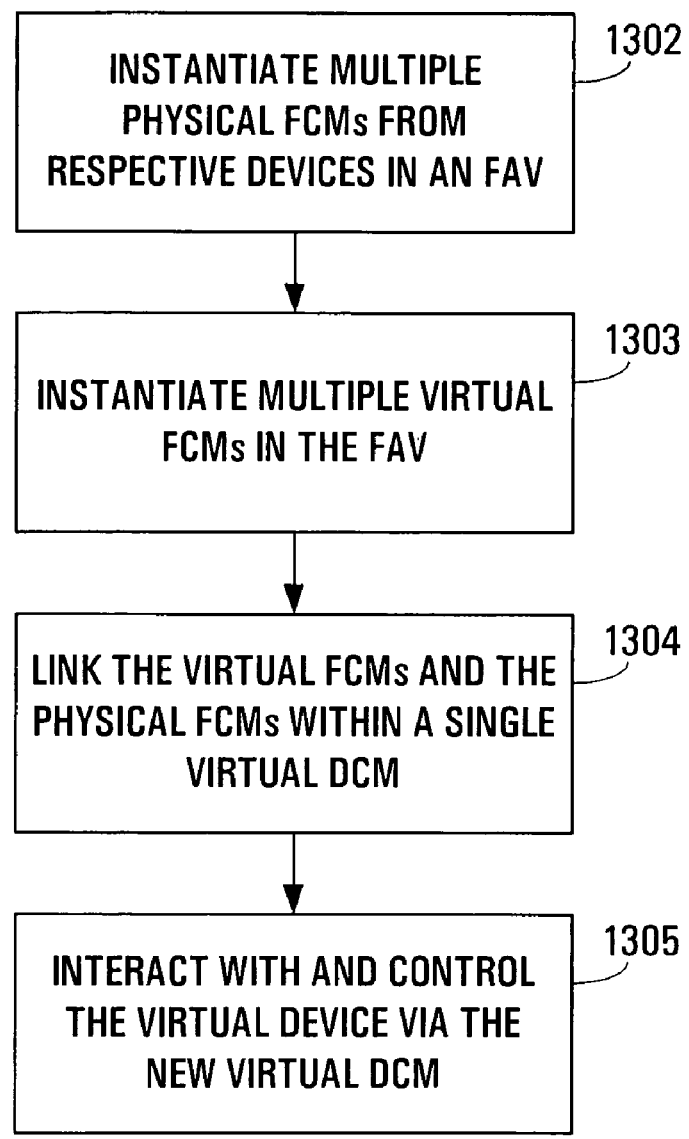
FIG. 13 shows a flow chart of the steps of a process of extending a home AV network through creation of a virtual device controlled via a virtual DCM in accordance with one embodiment of present invention.

With reference now to FIG. 13, a flow chart of the steps of a process 1300 for extending the capability of an entire HAVI network through the creation of a virtual device controlled via a virtual DCM in accordance with one embodiment of the present invention is shown. Process 1300 shows the steps involved in creating a virtual device controlled via a virtual DCM.

Process 1300 begins in step 1302, where multiple physical FCMs for respective devices are instantiated within a FAV node coupled to the HAVI network (e.g., network 10a shown in FIG. 1A). As described above, the software implementing the various physical FCMs is accessed by the FAV node and instantiated within its embedded computer system. In step 1303, multiple virtual FCMs are accessed by the FAV node and also instantiated within its embedded computer system. Then, in step 1304 the virtual FCMs and the physical FCMs are linked within one singular virtual DCM (e.g., as depicted in FIG. 11). The virtual DCM presents standardized HAVI network-compliant APIs required for interfacing with external software applications and external devices on the HAVI network.

Referring still to FIG. 13, the functionality of the various FCMs, both virtual and physical, are integrated within a standardized DCM format. As described above, the virtual DCM is accessed and interacted with in the same manner as a conventional physical DCM. Thus, in step 1305, other external applications on the HAVI network and other devices interact with and control the new virtual device via the new virtual DCM.

Thus, the present invention provides a new architecture for a home audiovisual system which corrects the interoperability and functionality problems of conventional prior art systems. The system of the present invention provides an architecture for an open, inter-operating, audiovisual system for devices within a home network which provides for easy extensibility of the features and functions of the devices. The architecture allows devices from any manufacturer to function seamlessly with a home audiovisual system and enables other devices from any other manufacturer to augment their functionality. The system of the present invention is extensible, and can be readily modified and advanced as market requirements and technology change. In addition, the system of the present invention implements a standardized, easily extensible method for augmenting the capability and functionality of simpler devices as new, more sophisticated devices are added within a HAVI system.

In the discussions below, specific examples of the software device extensions, APIs, and programming conventions will be shown and discussed. It should be appreciated that these examples are for the purposes of illustrating aspects of the present invention. Numerous specific details are shown; however, it should be noted by one skilled in the art that the present invention can be implemented and can be practiced without these specific software device extensions, APIs, programming conventions, and the like. Similarly, well known methods, procedures, components, etc. may not be fully described in detail in order to avoid unnecessarily obscuring aspects of the present invention.

As described above, the present invention, via the virtual DCM and virtual FCM constructs, describes a device extension mechanism for extending the functionality of devices coupled to a HAVI network. However, in addition to providing a "device extension" mechanism as described above, virtual DCMs can offer interfaces which reflect richer functionality than more simple extensions to existing devices. For example, a virtual DCM could encompass processing resources from several different devices (e.g., multiple FAV nodes). Such a virtual DCM could then serve as a mechanism for controlling and configuring distributed applications. Virtual FCMs and virtual DCMs and their interaction with respect to the HAVI specification are described herein below.

As described above, there are two basic FCM categories. A physical FCM refers to an FCM which controls the operation of a functional component of a target device. When a HAVI message is sent to a physical FCM, it results an implementation-dependent communication between the physical FCM and a target device. A virtual FCM refers to an FCM which controls the operation of software-implemented processes, usually hosted on a FAV node. When a HAVI message is sent to a virtual FCM, the message is processed internally by the FCM and does not necessarily involve communication with other devices on the HAVI network.

Both types of FCMs, in general, present both a control interface (a set of HAVI messages to which they respond) and a content interface (a set of plugs). In order to allow virtual FCMs the same range of functionality as physical FCMs, they are designed to be capable of presenting both content and control interfaces.

Implementation of an FCM depends upon whether the FCM is embedded (e.g., implemented in native code) or uploaded (implemented in Java byte code). The HAVI specification does not specify native APIs, therefore, implementation of an embedded FCM (whether physical or virtual) is entirely platform dependent. In the case of uploaded FCMs, which are inherently platform independent, the HAVI specification must specify the Java APIs needed for their implementation.

For example, in the case of a virtual FCM which sinks isochronous data, the HAVI Stream Manager can be used to establish a connection, resulting in data following to the FCM, but neither it nor the other HAVI system components include APIs which expose isochronous data. In order to process isochronous data, virtual FCMs must use the HAVI media package. Currently, the HAVI media package is a set of extensions to JMF (Java Media Framework).

JMF is a set of abstract classes that must be specialized for specific transport protocols and media content types. JMF also prescribes the manner in which it can be extended. For example. classes supporting new protocols should be placed in packages with names of the form:

<PACKAGE-PREFIX>.protocol.<PROTOCOL-NAME>

Classes which support new content formats are placed in packages with names of the form:

<PACKAGE-PREFIX>.media.<CONTENT-NAME>.<TYPE-NAME>

The havi.media extension supports the IEC 61883.1 protocol for transmission of isochronous data over IEEE 1394. It consists of the following packages and classes:

havi.media. protocol.IEC61883 //package
IEC61883DataSource //class
IEC61883MediaLocator //class
IEC61883PushSourceStream //class It should be noted that havi.media is a minimal extension to javax.media. Further extensions are possible.

IEC61883DataSource is a high-level abstraction by which virtual FCMs can obtain data from an isochronous channel. This class provides an interface for identifying the channel and for obtaining the lower-level IEC61883PushSourceStream object used to read isochronous data.

public class IEC61883DataSource
extends javax.media.protocol.DataSource

IEC61883MediaLocator is used to identify an isochronous channel. The constructor is of the form:

public IEC61883MediaLocator (Isocchannel channel)

IEC61883PushsourceStream provides a low-level interface for reading data from an isochronous channel. It has the form:

public class IEC61883pushsourcestream
extends through javax.media.protocol.pushsourceStream The following example illustrates how the above classes could be used in the implementation of a virtual FCM. This example is not complete and is merely intended to illustrate how the havi.media classes relate to each other and to give a possible template for their use.

```
import havi.media.protocol.IEC61883.*;
import javax.media.*;
import javax.media.protocol.*;
class ExamplevirtualFCM extends FCM {
    private IEC61883MediaLocator ml;
    private IEC61883DataSource src;
    private IEC61883PushSourceStream stream;
    public connectTosource(IecAddress pcr) {
        pushsourceStrearn [] pushStreams;
        ml = new IEC61883MediaLocator(pcr.Channel( ));
        src = new IEC61883DataSource (ml);
        pushstreams = src.getStreams( );
        stream = (IEC61883PushSourceStream) pushstrearns [0]
        stream.setTransferHandler (new MyTransferHandler ( ));
    }
    public run( ) {
        src.start( )
    }
} class MyTransferHandler implements SourceTransferHandler {
    private int length;
    private byte[]    buffer = null;
    public void transferData(PushSourceStreams) {
        if(buffer == null)
            length = 4 * s.getMinimumTransferSize( );
            buffer =  new byte [length];
        }
    s.read(buffer, 0, length);
        //process the data here
    }
}
```

With respect to the relationship with the Stream Manager, in the above example, the "plug control register," to be processed by ExampleVirtualFCM, is passed as a parameter in connectToSource. Typically this parameter is not selected by the application but rather by the Stream Manager. The DCM is then informed of this selection via DCM::Connect. A virtual FCM should be handled, by the Stream Manager, in the same manner as a physical FCM. Thus the recommended implementation for virtual FCMs is that DCM::Connect result in the instantiation of the IEC61883MediaLocator. This can he achieved by having DCM::Connect invoke FCM::ConnectToSource with the plug control register selected by the Stream Manager. The FCM::ConnectToSource API would then be implemented using the ConnectToSource method of the form shown above. Additional examples of virtual FCM and virtual DCM APIs are shown below.

DCM::AddVirtualFcm is used by a software element to become a virtual FCM of the target DCM. In the Registry, the SoftwareElementType attribute for the software element is changed from PRIVATE to GENERIC_FCM. The Registry modification request is issued by the DCM.

From the perspective of an application, the virtual FCM will be treated like other FCMs. In particular, DCM::Connect can be used to make connections involving the virtual FCM. As with connection requests in general, not all requests may be possible for the DCM to configure. In the case of connections involving virtual FCMs, the DCM allows connections from IEC61883 input plugs to the virtual FCM.

DCM::RemoveVirtualFCM( ) results in the removal of the caller, which usually is a virtual FCM, from the set of FCMs associated with the target DCM. In the Registry, the SoftwareElementType attribute for the calling software element is changed from GENERIC_FCM to PRIVATE. The Registry modification request is issued by the DCM.

FCM::ConnectToSource(in ipcrNum, in plugNum) is used by a DCM to indicate to a virtual FCM that ipcrNum is to be bound to the FCM input plug indicated by plugNum, where ipcrNum is the number of an IEC61883 input plug, and plugNum is the number of an FCM input plug.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A system for providing software based extended functionality of a target device in a home audio video network, the system comprising:
    a computer system included within a host device coupled to the home audio video network, the computer system having a processor coupled to a memory via a bus, the computer system configured to enable proxy control of a target device coupled to the home audio video network by executing software stored in the memory, wherein the software causes the computer system to implement:
        a DCM (device control module) operable for interfacing with the target device, wherein the DCM includes a first FCM (function control module) and a second FCM operable for controlling respective first and second functional components of the target device;
        the first FCM being a physical FCM operable for controlling the operation of the first functional component; and
        the second FCM being a virtual FCM operable for controlling the operation of a second functional component, wherein the second functional component is a virtual functional component implemented using software executing on the computer system within the host device.

2. The system of claim 1, wherein the DCM is configured to provide a standardized DCM interface operable to enable proxy control of the target device by an external device coupled to the home audio video network.

3. The system of claim 1, wherein the virtual FCM is configured to provide a standardized interface for the virtual functional component to enable control of the virtual functional component via the standardized DCM interface.

4. The system of claim 1, wherein the virtual functional component is a software based process executing on the host device.

5. The system of claim 1, wherein the first FCM and the second FCM are configured to present standardized control interfaces and standardized content interfaces to an external device coupled to the home audio video network.

6. The system of claim 1, wherein the second FCM is adapted to be transferred to the host device from an external device via the home audio video network.

7. The system of claim 1, wherein the second FCM is implemented in Java bytecode.

8. The system of claim 1, wherein the home audio video network is HAVI (Home Audio Video Interoperability) specification compliant.

9. A system for extending the functionality of a home audio video network through the implementation of a virtual device, the system comprising:
    a host device coupled to a home audio video network;
    a computer system included within the host device, the computer system having a processor coupled to a memory via a bus, the computer system configured to enable proxy control of a target device coupled to the home audio video network by executing software stored in the memory, wherein the software causes the computer system to implement:
        a virtual DCM (device control module) operable for interfacing with a virtual device, wherein the virtual DCM includes a first FCM (function control module) and a second FCM operable for controlling respective first and second functional components of the virtual device; and
        a standardized interface operable to enable proxy control of the virtual device by an external device coupled to the home audio video network, wherein the standardized interface is provided by the virtual DCM.

10. The system of claim 9, wherein the virtual DCM wherein the first functional component is a physical component in a first device, and the second functional component is a physical component in a second device.

11. The system of claim 9, wherein at least one of the first FCM and the second FCM is a virtual FCM operable for controlling the operation of a virtual functional component implemented using software executing on the computer system within the host device.

12. The system of claim 11, wherein the virtual functional component is a software based process executing on the host device.

13. The system of claim 11, wherein the virtual functional component is configured to present a standardized control interface.

14. The system of claim 11, wherein the virtual functional component is configured to present a standardized content interface to an external device coupled to the home audio video network.

15. The system of claim 11, wherein the virtual FCM is implemented in Java bytecode.

16. The system of claim 9, wherein the virtual DCM is implemented in Java bytecode.

17. The system of claim 9, wherein the home audio video network is HAVI (Home Audio Video Interoperability) specification compliant.

18. In a computer system included within a host device coupled to a home audio video network, a method for providing software based extended functionality of a target device coupled to the home audio video network, the method implemented by the computer system, wherein the computer system includes a processor coupled to a memory via a bus, the memory storing software which when executed by the processor cause the processor to implement the steps of:

a) interfacing with a target device coupled to a home audio video network via a DCM (device control module), wherein the DCM includes a first FCM (function control module) and a second FCM operable for controlling respective first and second functional components of the target device;

b) controlling the operation of the first functional component using the first FCM, wherein the first FCM is a physical FCM;

c) controlling the operation of the second functional component using the second FCM, wherein the second FCM is a virtual FCM and wherein the second functional component is a virtual functional component implemented using software executing on the computer system within the host device; and d) implementing proxy control of the target device by an external device coupled to the home audio video network, wherein the external device controls the target device via the DCM.

19. The method of claim 18, wherein the DCM is configured to provide a standardized DCM interface operable to enable proxy control of the target device by an external device coupled to the home audio video network.

20. The method of claim 18, wherein the virtual FCM is configured to provide a standardized interface for the virtual functional component to enable control of the virtual functional component via the standardized DCM interface.

21. The method of claim 18, wherein the virtual functional component is a software based process executing on the host device.

22. The method of claim 18, wherein the first FCM and the second FCM are configured to present standardized control interfaces and standardized content interfaces to an external device coupled to the home audio video network.

23. The method of claim 18, wherein the second FCM is adapted to be transferred to the host device from an external device via the home audio video network.

24. The method of claim 18, wherein the second FCM is implemented in Java bytecode.

25. The method of claim 18, wherein the home audio video network is HAVI (Home Audio Video Interoperability) specification compliant.

26. The system of claim 1 wherein the virtual FCM controls the operation of the virtual functional component by assembling a plurality of different FCMs from a corresponding plurality of different devices.

27. The system of claim 1 wherein the virtual functional component corresponds to a virtual device assembled from a plurality of different devices.

* * * * *